United States Patent
Herzog et al.

(10) Patent No.: US 11,226,647 B2
(45) Date of Patent: Jan. 18, 2022

(54) POWER SUPPLY MODULE

(71) Applicant: Festo SE & Co. KG, Esslingen (DE)

(72) Inventors: Andreas Herzog, Köngen (DE); Timo Dreesmann, Dettingen unter Teck (DE)

(73) Assignee: FESTO SE & CO. KG, Esslingen (DE)

(*) Notice: Subject to any disclaimer, the term of this patent is extended or adjusted under 35 U.S.C. 154(b) by 0 days.

(21) Appl. No.: 17/066,673

(22) Filed: Oct. 9, 2020

(65) Prior Publication Data
US 2021/0109555 A1    Apr. 15, 2021

(30) Foreign Application Priority Data

Oct. 11, 2019  (DE) .......................... 102019215606.1

(51) Int. Cl.
| | |
|---|---|
| *H02H 3/00* | (2006.01) |
| *G05F 1/625* | (2006.01) |
| *H02J 1/00* | (2006.01) |

(52) U.S. Cl.
CPC ............. *G05F 1/625* (2013.01); *H02H 3/003* (2013.01); *H02J 1/00* (2013.01)

(58) Field of Classification Search
CPC .. G05F 1/625; H02J 1/00; B60R 16/03; B60T 17/004; H02H 3/003; Y02D 30/50; F15B 13/0889; F15B 13/0857; F15B 13/0846; F15B 13/08; H04L 12/40; H04L 12/40143; H04L 12/10; H04L 12/40182
See application file for complete search history.

(56) References Cited

U.S. PATENT DOCUMENTS

2014/0312703 A1* 10/2014 Forcht ................. F15B 13/0839
307/80

FOREIGN PATENT DOCUMENTS

| DE | 102016213725 A1 | 2/2018 |
|---|---|---|
| DE | 102018201382 A1 | 8/2019 |
| WO | 2013/075729 | 5/2013 |

* cited by examiner

Primary Examiner — Bryan R Perez
(74) Attorney, Agent, or Firm — Hoffmann & Baron, LLP

(57) ABSTRACT

A supply module includes an electrical control input and an electrical supply input as well as an electrical control output and an electrical supply output, as well as a control line arranged between the control input and the control output, which is designed for the transmission of control information, wherein at least one supply line group is assigned to the electrical supply input, which group includes a supply feed line and a supply outlet line, which are each extended between the electrical supply input and the electrical supply output, and which includes a switching module which is coupled to the control line and which has a feed switch arranged in the supply feed line, wherein a consumer output is formed for an electrical supply of an external consumer and is connected via an output feed line to the supply feed line and via an output drain line to the supply outlet line, the output feed line being connected between feed switch and the electrical supply output.

7 Claims, 1 Drawing Sheet

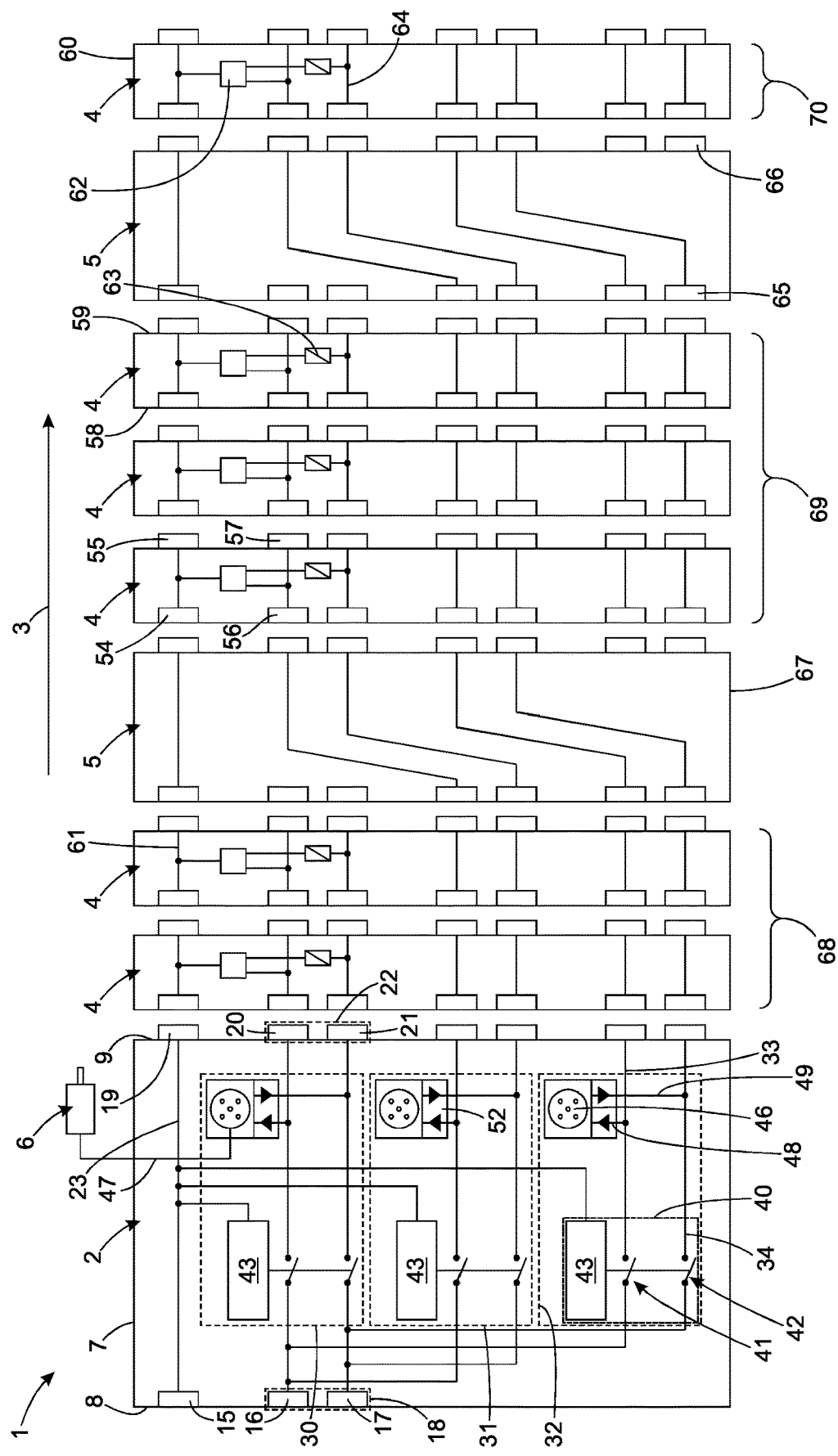

POWER SUPPLY MODULE

BACKGROUND OF THE INVENTION

The invention concerns a supply module.

DE 10 2016 213 725 A1 discloses a series module for a modular control arrangement, which comprises a first series interface and a first bus interface as well as a second series interface and a second bus interface, wherein a bus communication line is formed between the two bus interfaces and several connecting lines are formed between the two series interfaces and wherein the connecting lines between the two series interfaces are at least partially Z-linked.

SUMMARY OF THE INVENTION

The task of the invention is to provide a power supply module with an increased functional range.

This task is solved for a supply module of the type mentioned above with the following features: the supply module comprises a module housing having a first coupling surface for coupling with a preceding functional component of a valve module arrangement and a second coupling surface for coupling with a subsequent functional component of the valve module arrangement, wherein an electrical control input and an electrical supply input are formed on the first coupling surface, and wherein an electrical control output and an electrical supply output are formed on the second coupling surface, wherein a control line is arranged between the control input and the control output, which control line is designed to transmit control information, wherein at least one supply line group is assigned to the electrical supply input, which comprises a supply inlet line and a supply outlet line each extending between the electrical supply input and the electrical supply output, and which comprises a switching module which is coupled to the control line and which has a supply switch arranged in the supply inlet line for selectively connecting and disconnecting the supply inlet line, wherein a consumer output is arranged on a side surface of the module housing, which consumer output is designed for an electrical supply of an external consumer and which is connected by an output feed line with the supply inlet line and which is connected by an output drain line with the supply outlet line, wherein the output feed line is connected with the supply inlet line between the feed switch and the electrical supply output.

The module housing of the supply module is provided for arrangement in a group of functional modules in order to form a functional unit, with the aid of which, for example, a certain number of pneumatic actuators and/or electrical actuators can be operated, which are used in particular in a complex processing machine. For example the module housing is a cube, whereby one surface of the module housing is designed as a first coupling surface for coupling the supply module to a previously arranged functional component, which may be a component of a valve module arrangement. A second coupling surface of the supply module, which is oriented averted or opposite to the first coupling surface is designed for coupling the module housing to a further functional component.

For an electrical connection of adjacent functional components, an electrical control input and an electrical supply input are provided on the first coupling surface. The electrical control input is used for the transmission of control signals which can be transmitted between the functional components and which are in particular provided from a higher-level control system. These control signals can be analog signals or digital signals or a combination of analog signals and digital signals. Preferably, the control signals are digitally coded and correspond to a proprietary bus protocol or to a generally available bus protocol. An electrical supply voltage is provided via the electrical supply input. As an example, it can be assumed that a ground potential and a supply voltage potential which is different from the ground potential are provided at the electrical supply input.

At the second coupling surface an electrical control output and an electrical supply output are formed, which correspond to the combination of the electrical control input and the electrical supply input as described above. Preferably, the electrical control input and the electrical control output are designed as corresponding plug connections, in particular a combination of a first plug and a corresponding first socket, and the electrical supply input and the electrical supply output are also designed as corresponding plug connections, in particular a combination of a second plug and a corresponding second socket.

Within the module housing, a control line is arranged between the control input and the control output, which is designed for the transmission of control information. For example, the control line can comprise exactly one electrical line or can be formed from a group of several electrical lines.

The power supply module also includes a power supply line group located in the module housing. The task of the supply line group is to supply one or more electrical consumers, which may be solenoid valve actuators or electric motors, with electrical energy. For example, a functional module downstream of the supply module can be designed as a valve module designed to control a pneumatic actuator, in particular a pneumatic cylinder. Such a valve module typically comprises a solenoid valve that can be switched between two functional positions, for example between an open position and a closed position, with the aid of electrical energy that can be provided via the electrical supply input. Preferably, a control command for switching the solenoid valve is provided via the control line. A control unit connected to the control line is located in the valve module, which is designed to release the electrical energy to the solenoid valve. In order to enable a safety-related shutdown of the solenoid valve, it may be necessary to perform at least a single-channel shutdown of the electrical energy for the solenoid valve in addition to a corresponding control signal which is provided to the control unit. This task can be performed by the supply line group of the valve module.

It is intended that the supply line group comprises a supply inlet line and a supply outlet line, each of which extending between the electrical supply input and the electrical supply output. The supply line group comprises electrical lines which may be formed on a printed circuit board or a flexprint. Furthermore, the supply line group comprises a switching module which is coupled to the control line and which is designed for a conversion of control commands which can be transmitted via the control line into switching commands for a supply switch which is arranged in the supply inlet line. With the help of the supply switch a connection or interruption of the supply inlet line can be realized, so that with the help of the switching module an influence can be taken on whether the electrical energy fed into the supply inlet line at the electrical supply input is also provided at the electrical supply output or whether this is not the case.

In addition to the electrical supply output, which is provided for an electrical coupling with an electrical consumer in at least one functional module following in the direction of arrangement, the supply line group further comprises a consumer output, which is arranged on a side surface of the module housing. This side surface is arranged in particular adjacent to the first coupling surface and also adjacent to the second coupling surface. The consumer output is used for the electrical supply of an external consumer, for example an electrical actuator, in particular an electric motor. The external consumer is not designed as a functional module of the valve module arrangement, but is designed for an arrangement away from the line-up of functional modules using a cable connection between the supply module and the external consumer. It may be provided that the electrical energy provided at the consumer output is directly used for the operation of the external consumer. Alternatively, it can be provided that the electrical energy provided at the consumer output is used to control a relay or a contactor, with the help of which electrical energy from a separately designed electrical supply source is then provided to the external consumer.

An electrical connection of the consumer output with the supply inlet line and the supply outlet line is realized via an output feed line which is connected to the supply inlet line and via an output drain line which is connected to the supply outlet line. The output feed line is connected with the supply inlet line between the supply switch and the electrical supply output. This enables an interruption (disconnection) of an electrical power supply for the consumer output and the external consumer connected to it by means of the switching module.

Accordingly, the switching module enables a combined electrical supply of at least one electrical consumer, which is arranged in a function module, in particular a valve module, attached to the second coupling surface and connected to the electrical supply output, and of an external electrical consumer, which is connected to the consumer output, for example by means of a cable connection. The switching module is preferably used for a safety-oriented electrical supply of these electrical consumers. The supply switch can be used to switch off the consumers by at least one channel.

Preferably the electrical supply input comprises at least two supply line groups. This allows the definition of at least two functional areas for the functional modules subsequently attached to the supply module, wherein these functional areas are to be supplied with electrical energy independently from each other. Each of the functional areas may comprise one or more functional modules. As an example, it is provided that the at least two supply line groups connected to the electrical supply input provide the same electrical voltage at the respective associated electrical supply output. Alternatively, it can also be provided that in at least one of the supply line groups an increase or a reduction of the electrical voltage, which is provided at the respectively associated electrical supply output, is carried out by suitable electrical components Preferably the switching module has a drain switch located in the supply outlet line for a selective connection and interruption/disconnection of the supply outlet line, wherein the output drain line is connected with the supply outlet line in a region between the drain switch and the electrical supply output. This enables a two-channel interruption of the electrical power supply for the electrical supply output and the consumer output. As an example, the drain switch is used to disconnect an electrical ground connection, while the supply switch is used to disconnect a connection to an electrical supply potential. The supply switch and the drain switch can be designed technically identical, which allows a redundant interruption of the electrical energy supply for the electrical supply output and the consumer output. Alternatively, it can be provided that the supply switch and the drain switch are designed technically differently, for example as semiconductor switch or as electromechanical switch (relay), to allow a diverse redundant interruption of the electrical energy supply for the electrical supply output and the consumer output.

According to an advantageous embodiment of the invention, it is provided that a processing unit for coupling the switching module to the control line is provided, which processing unit is designed for processing control commands which can be provided via the control line. These control commands may be digitally coded and may include safety-related commands Such a processing unit is required if digitally coded control signals, which may be intended for the switching module, are also or exclusively transmitted via the control line. The processing unit may be realized as a microprocessor or a microcontroller. The processing unit is designed to convert the digitally coded control signals into control signals for the switching module. The processing unit can be designed for unidirectional or bidirectional communication with a control system. In the case of unidirectional communication, only control signals which are issued by a control system, in particular a safety control system, are received in the processing unit and converted into signals to be used to control the switching module. In the case of bidirectional communication, in addition status messages from the processing unit and/or the switching module, for example, can be transmitted to the control system via the control line.

According to a further embodiment of the invention it is provided that the processing unit is configured in such a way that for a switching-off of an electrical energy supply of the consumer output a combined control of the supply switch and the drain switch is provided and that for a switching-off of an electrical energy supply of the electrical supply output optionally a combined control of the supply switch and the drain switch or a separate control of the supply switch or the drain switch is carried out. Parameters may be provided to the processing unit with regard to the control of the supply switch and the drain switch so that, in the event that no external consumer is connected to the consumer connection, a selection for an interruption of the electrical supply of the electrical supply output is possible. According to a first alternative a single-channel electrical cut-off is provided by controlling only the supply switch or only the drain switch. According to a second alternative a two-channel electrical cut-off is provided by controlling the supply switch and the drain switch, in particular in parallel. The selection or choice between the control of the supply switch and the control of the drain switch and the resulting interruption of the supply inlet line or the supply outlet line may be dependent from the design of the downstream function modules. These downstream function modules may be designed for a disconnection of their ground line or for a disconnection of their supply line and thus an adapted disconnection for the respective function modules may be provided by the choice of the supply switch or drain switch.

It is preferred that a protective circuit is assigned to the output supply line and/or to the output drain line. The protective circuit is designed to prevent a coupling of electrical energy from the consumer output to the electrical supply input and/or the electrical supply output. The task of the protective circuit is to prevent an undesired electrical supply of electrical consumers which are connected to the supply module via the electrical supply output in case a supply voltage is provided by an electrical consumer at the consumer output due to a fault case.

It is useful if the protective circuit comprises a diode located in the output supply line and/or a diode located in the output drain line. The orientation of the diode in one of the lines or the diodes in both lines is such that the diode is in forward direction for currents flowing from the electrical supply input to the consumer output. For an energy flow in the opposite direction, which must be prevented, the diode or diodes are in blocking mode.

BRIEF DESCRIPTION OF THE DRAWINGS

An advantageous embodiment of the invention is shown in the drawing. Here shows:

FIG. 1: a strictly schematic representation of a circuit diagram for a valve module arrangement in which several function modules are connected to one supply module.

DETAILED DESCRIPTION

A valve module arrangement 1 as shown in FIG. 1 comprises a supply module 2 and valve modules 4 and distribution modules 5 arranged in a linear arrangement along an assembly axis 3. The illustration in FIG. 1 focuses exclusively on the electrical supply aspect and does not contain any information on the pneumatic circuitry. Furthermore, FIG. 1 does not show any functional components upstream of supply module 2 along the linear axis 3, such as a bus coupler designed to connect the valve module arrangement 1 to a higher-level controller, which is also not shown, or a power supply module designed to feed an electrical supply voltage into supply module 2.

Supply module 2 is designed for a safety-related electrical supply of several valve modules 4 and of external consumers 6. An external consumer 6, designed as an electric motor, is connected to supply module 2.

Supply module 2 is accommodated in a module housing 7, which is designed purely as an example, at least essentially in the shape of a cuboid. A lateral surface of the module housing 7 is designed as the first coupling surface 8 for coupling with a previously attachable functional component of the valve module arrangement 1 (not shown in FIG. 1), such as a bus coupler or a power supply module. By way of example the first coupling surface 8 is equipped with a control socket 15 which serves as a control input and is designed as an electromechanical socket. In addition, two first and second supply sockets 16, 17, which are designed as electromechanical sockets, form an electrical supply input 18.

A second lateral surface of the module housing 7, which is oriented opposite the first coupling surface 8, is designed as a second coupling surface 9 for coupling with a downstream functional component of the valve module arrangement 1, such as a valve module 4. A control plug 19, which serves as a control output and is designed as an electromechanical connector, is provided on the second coupling surface 9 as a purely exemplary design. In addition, two first and second supply plugs 20, 21, designed as electromechanical plugs, are provided on the second coupling surface 9 to form a electrical supply output 22.

Within the module housing 7, a control line 23 extends between the control socket 15 and the control plug 19. The control line 23 may be realized as a single electrical line or as an arrangement of several electrical lines and is designed for the transmission of electrical control information. The electrical control information is preferably provided in the form of different electrical voltage levels or current levels. Depending on the design of the control line 23, in particular depending on the number of electrical lines within the control line 23, the control socket 15 and the control plug 18 are each equipped with a number of unspecified contact elements corresponding at least to the number of electrical lines.

In addition, the module housing 7 contains three supply line groups 30, 31, 32, which are provided for the electrical supply of the function modules that can be attached to supply module 2, such as the valve modules 4. As a purely exemplary design, each of the supply line groups 30, 31, 32 comprises a supply inlet line 33 electrically connected to the first supply socket 16 and a supply outlet line 34 connected to the second supply socket 17.

Each of the supply inlet lines 33 extends from the first supply socket 16 to a first supply plug 20, which is individually associated with the respective supply line group 30, 31, 32. A respective supply switch 41 is arranged in the respective supply inlet line 33, which supply switch 41 enables an opening and closing of an electrical connection between the first supply socket 16 and the respective first supply plug 20.

Each of the supply outlet lines 34 extends from the second supply socket 17 to a second supply plug 21, which is individually associated with the respective supply line group 30, 31, 32. A respective drain switch 42 is arranged in the respective supply outlet line 34, which drain switch 42 enables an opening and closing of an electrical connection between the second supply socket 17 and the respective second supply plug 21.

The first supply plug 20 and the second supply plug 21 each forms the electrical supply output 22 of the respective supply line group 30, 31, 32.

As an example, the supply inlet line 33 and the supply outlet line 34 are each designed as electrical lines that provide electrical power for supplying the functional components connected to the supply module 2, such as the valve modules 4. The designation "supply inlet line 33" and the designation "supply outlet line 34" only serves to differentiate between the two lines, but does not determine the direction in which an electric current flows in the respective line.

Each of the supply line groups 30, 31, 32 is assigned a switching module 40, which is designed for a safety-oriented disconnection of an electrical supply of function modules connected downstream to supply module 2. The switching module 40 comprises, purely as an example, the supply switch 41 located in the supply inlet line 33 and the drain switch 42 located in the supply outlet line 34. The supply switch 41 and the drain switch 42 are electrically connected to the switching control 43, which is designed to provide switching signals to the supply switch 41 and the drain switch 42 in order to enable a respective connection and interruption of the supply inlet line 33 and/or the supply outlet line 34. The switching control 43 is electrically connected to the control line 23 and is designed for unidirectional reception of control commands which can be transmitted via the control line 23 or for bidirectional communication with other communication participants which are also connected to the control line 23. As an example, the switching control 43 comprises a microprocessor, not shown in detail, in which a computer program can be processed. By means of the computer program a conversion of control commands which are transmitted via the control line 23 into switching signals for the supply switch 41 and the drain switch 42 can be carried out.

With the supply switch 41 and the drain switch 42, a two-channel interruption of the electrical supply connection between the electrical supply input 18 and the electrical supply output 22 of the respective one of the supply line groups 30, 31, 32 is possible. As an alternative only the supply switch 41 or the drain switch 42 are used for a safety-oriented interruption of the electrical supply connection between the electrical supply input 18 and the electrical supply output 22 of the respective supply line group 30, 31, 32.

On one side of the module housing 7, for example between the first coupling surface 8 and the second coupling surface 9, facing the observer according to FIG. 1, a consumer output 46 is arranged, which is designed for the electrical supply of an external consumer 6. As an example, the consumer output 46 is designed as a socket and enables an electrical connection of the consumer 6 via a connecting cable 47, which is only shown schematically and has a plug corresponding to the consumer output 46. The consumer output 46 is connected to the supply inlet line 33 via an output feed line 48 and to the supply outlet line 34 via an output drain line 49. It is intended that the output feed line 48 is connected to the supply inlet line 33 in a region between the supply switch 41 and the electrical supply output 22. Furthermore, it is provided that the output drain line 49 is connected to the supply outlet line 34 in a region between the drain switch 42 and electrical supply output 22. This allows for a parallel supply of an electrical consumer 6 connected to the consumer output 46 and one or more function modules connected to the respective electrical supply output 22. Furthermore, a safety shutdown of the electrical consumer 6 connected to consumer output 46 and of function modules connected to the respective electrical supply output 22 can be provided.

In order to avoid an undesired coupling or insertion of electrical energy from the electrical consumer 6 connected to the consumer output 46 into the supply module 2, the output feed line 48 and the output drain line 49 are each equipped with components of a protective circuit 52, e.g. diodes, as known from DE 10 2006 006 878 A1.

Purely by way of example the valve module arrangement 1 comprises several valve modules 4 and several distribution modules 5, which are coupled to the second coupling surface 9 of the power supply module 2 along the axis 3 of the valve module arrangement 1.

As an example, the valve module 4 comprises an essentially cuboid module housing 60, which is provided with a control socket 54 and several input sockets 56 on a first coupling surface 58 and with a control plug 55 and several output plugs 57 on a second coupling surface 59. A control line 61 extends between the control socket 54 and the control plug 55, to which a control unit 62 is connected. The control unit 62 is designed to convert control commands transmitted via the control line 61 into switching signals for a solenoid valve 63. With the solenoid valve 63, a fluid flow, e.g. a compressed air flow, between a compressed air source (not shown) and a compressed air consumer (also not shown), can be enabled or blocked respectively.

For the electrical supply of the solenoid valve 63, connecting lines 64 are provided in the valve module 4 between the input sockets 56 and the output plugs 57. As an example, the solenoid valve 63 is connected to the two upper connecting lines 64 of the six connecting lines 64. The remaining four lower connecting lines 64 are not in electrical contact with the solenoid valve 63 and can be used to conduct electrical energy through the respective valve module 4.

A switching operation of the solenoid valve 63 requires both an electrical supply via the two connecting lines 64 and a switching signal from the control unit 62. If the solenoid valve 63 is a normally closed (NC) 2/2-way switching valve, the provision of a fluid flow requires both an electrical supply to the solenoid valve 63 via the two connecting lines 64 and the establishment of an electrical connection between the two connecting lines 64 based on a switching signal from the control unit 62. If these conditions are met, the 2/2-way switching valve can be switched from a closed position to an open position. As soon as either no switching signal is present and/or at least one of the two connecting lines 64 is no longer available for a current flow, the 2/2-way switching valve is switched from the open position to the closed position. Accordingly, the 2/2-way switching valve can be transferred to the closed position, for example, by opening the supply switch 41 and/or the drain switch 42. This can be done, for example, if a safety-related shut-off of a fluid flow through the 2/2-way switching valve is required which cannot be effected with sufficient reliability via control line 61.

The distribution module 5 comprises only six input sockets 65 and six output sockets 66, which are arranged at a predetermined distance from each other in relation to a module housing 67 of distribution module 5. As an example, the two upper input sockets 65 are not connected to the corresponding output plugs 66. Instead, the two middle input sockets 65 are connected to the two output sockets 66, which correspond to the upper input sockets 65. Furthermore, the lower input sockets 65 are connected to the two output sockets 66, which correspond to the middle input sockets 65. This type of electrical connection is also known as Z-linking and makes it possible to arrange suitably designed functional components such as valve modules 4 in different electrical supply zones despite the identical design. In the valve module arrangement 1 as shown in FIG. 1, a total of three electrical supply zones 68, 69, and 70 are provided, which can be independently supplied with electrical energy or disconnected from this electrical supply by means of the switching modules 40 in supply module 2.

What is claimed is:

1. A supply module comprising a module housing having a first coupling surface a second coupling surface, wherein an electrical control input and an electrical supply input are arranged on the first coupling surface and wherein an electrical control output and an electrical supply output are arranged on the second coupling surface, with a control line arranged between the control input and the control output, which is designed for the transmission of control information, wherein at least one supply line group is assigned to the electrical supply input, which comprises a supply inlet line and a supply outlet line, each of which extends between the electrical supply input and the electrical supply output, and which comprises a switching module which switching module is coupled to the control line and which has a supply switch arranged in the supply inlet line for selectively connecting and disconnecting the supply inlet line, wherein a consumer output is arranged on a side surface of the module housing, which consumer output is designed for an electrical supply of an external consumer and is connected to the supply inlet line via an output feed line and to the supply outlet line via an output drain line, the output feed line being connected to the supply inlet line in a region between the supply switch and the electrical supply output.

2. The supply module according to claim 1, wherein at least two supply line groups are assigned to the electrical supply input.

3. The supply module according to claim 1, wherein the switching module comprises a drain switch arranged in the supply outlet line for a selective connection and interruption of the supply outlet line and that the output drain line is connected to the supply outlet line in a region between the drain switch and the electrical supply output.

4. The supply module according to claim 1, wherein a processing unit is provided for coupling the switching module to the control line, which processing unit processes control commands being provided via the control line.

5. The supply module according to claim 4, wherein the processing unit actuates the feed switch and the drain switch to power off an electrical power supply to the consumer output, and actuates the supply switch and the drain switch or only the supply switch or only the drain switch for switching off an electrical power supply to the electrical supply output.

6. The supply module according to claim 1, wherein a protective circuit is associated with the output feed line and/or the output drain line, which protective circuit prevents electrical energy from being coupled from the consumer output to the electrical supply input and/or the electrical supply output.

7. The supply module according to claim 6, wherein the protective circuit comprises a diode arranged in the output feed line and/or a diode arranged in the output drain line.

* * * * *